(12) United States Patent
Huege et al.

(10) Patent No.: US 7,202,197 B2
(45) Date of Patent: Apr. 10, 2007

(54) ORGANIC LIME SLURRY AND METHOD OF PREPARATION

(75) Inventors: Fred R. Huege, Colleyville, TX (US); Diethelm Walter, Wuelfrath (DE); Christopher Pust, Wuelfrath (DE)

(73) Assignee: Chemical Lime Co., Fort Worth, TX (US)

( * ) Notice: Subject to any disclaimer, the term of this patent is extended or adjusted under 35 U.S.C. 154(b) by 672 days.

(21) Appl. No.: 10/463,291

(22) Filed: Jun. 17, 2003

(65) Prior Publication Data

US 2004/0258612 A1    Dec. 23, 2004

(51) Int. Cl.
*C10M 125/10*    (2006.01)
*C01F 11/02*    (2006.01)

(52) U.S. Cl. ...................... 508/154; 423/640
(58) Field of Classification Search .................. 508/154
See application file for complete search history.

(56) References Cited

U.S. PATENT DOCUMENTS

| | | | | |
|---|---|---|---|---|
| 2,956,017 A | * | 10/1960 | Franks | ........................ 508/177 |
| 3,844,955 A | * | 10/1974 | Green | ........................ 508/141 |
| 3,961,511 A | * | 6/1976 | Wolfe | ............................. 72/42 |
| 5,191,098 A | * | 3/1993 | Koenig et al. | ............... 554/156 |
| 5,223,239 A | | 6/1993 | Moran et al. | ................ 423/640 |
| 5,258,190 A | * | 11/1993 | Cante et al. | ................... 426/74 |
| 5,332,436 A | * | 7/1994 | Walker et al. | ............... 106/792 |
| 5,492,685 A | | 2/1996 | Moran et al. | ................ 423/244 |
| 5,616,283 A | * | 4/1997 | Huege et al. | ................ 252/192 |
| 5,631,313 A | * | 5/1997 | Bishop et al. | ................. 524/45 |
| 5,705,141 A | | 1/1998 | Dumont et al. | .............. 423/640 |
| 6,634,576 B2 | * | 10/2003 | Verhoff et al. | ................. 241/21 |
| 6,926,879 B2 | * | 8/2005 | Huege et al. | ................ 423/636 |

\* cited by examiner

*Primary Examiner*—Ellen M. McAvoy
(74) *Attorney, Agent, or Firm*—Charles D. Gunter, Jr.

(57) ABSTRACT

A method is shown for producing stable, non-settling calcium hydroxide slurries with defined solids, viscosity, reactivity, and particle size. A traditional hydrated lime is first blended with an organic solvent. The hydrated lime and organic solvent blend is then wet-milled in a media mill. The resulting slurries can be used in applications where the addition of aqueous calcium hydroxide slurries would be a disadvantage such as in the production of solvent based oils, greases and lubrication products. The process can also be used to produce stable, non-settling, ultra-fine particles of calcium oxide in organic solvents, where fine particles are needed for processing in organic matrices.

10 Claims, 1 Drawing Sheet

ORGANIC LIME SLURRY AND METHOD OF PREPARATION

BACKGROUND OF THE INVENTION

1. Field of the Invention

The present invention relates generally to lime slurries and, more specifically, to a calcium hydroxide slurry produced with an organic liquid as a base.

2. Description of the Prior Art

Lime has a variety of uses. It is commonly used in treating waste water and sewage. It is used in agriculture to neutralize acidic soils and to provide nutrients for sustaining plant life. Lime is also used extensively in construction for the stabilization of soils and as a component in a variety of building materials. Lime is also used in a variety of "food grade" products intended for human consumption.

In this description, the term "lime" will be understood to mean both quicklime (calcium oxide) and hydrated lime (calcium hydroxide). Quicklime is produced by heating limestone (calcium carbonate) in a kiln at extreme temperatures to "calcine" the material and thereby drive off carbon dioxide. Quicklime is usually in the form of lumps or pebbles. In order to further process lime and improve the ease with which it is handled, dry lime is often mixed with water to form a slurry. In the case of quicklime, the water reacts with the quicklime in an exothermic reaction to form hydrated lime. This is often referred to as slaking. During the slaking of quicklime, large amounts of heat are given off which can significantly raise the temperature of the slurry. Water can then be driven off to produce dry, hydrated lime which is usually a powder. The term "lime" in this discussion will also be understood to encompass dolomite and dolomitic quicklime, i.e., $CaO \cdot MgO$ and $Ca(OH)_2 \cdot Mg(OH)_2$.

Worldwide, about 120 million tons of quicklime are produced every year (not including captive lime production and small lime producers in developing countries). As mentioned above, significant markets for lime products exist in such diverse industries as iron- and steel-making, chemicals generally, construction and civil engineering, gas and water treatment and the agriculture and food industries. In many of these commercial applications for lime products, quicklime is "slaked" as described above to form calcium hydroxide, $Ca(OH)_2$, and is then finally used in the form of a suspension of hydrated lime particles in water, usually referred to as a "lime slurry", or more accurately as a calcium hydroxide slurry.

The transformation of quicklime into hydrated lime may be accomplished by the customer, as by purchasing quicklime and slaking it "on site" or by purchasing hydrated lime and mixing it with water on site. Alternatively, the transformation may be completed directly at the producing lime plant (also by slaking quicklime in water or by mixing hydrated lime with water). In the latter case, the lime producers are able to apply additional process steps which allow the manufacture of specialty products with defined chemical and physical properties to match the specific needs of individual customers. Examples of such additional process steps include air classification of dry hydrated lime prior to mixing with water and the wet milling of calcium hydroxide slurries.

Such tailor-made and "ready to use" calcium hydroxide slurries become increasingly important in many applications, because they require less handling efforts and allow more accurate dosing as well as increased process automation. The viscosity and the sedimentation rate of such slurries are important quality parameters for these products, because they directly affect the flow properties and storage stability of the slurries.

The flow properties of these calcium hydroxide slurries mainly depend on solids content and particle size distribution and may vary from a product with the handling characteristics of a real liquid (sometimes referred to as a "low solids" slurry) to a semi-fluid paste (sometimes referred to as a "lime-putty"). A high solids content is important for the acid neutralization potential and the transport economy of these slurries because less water has to be transported. Additionally, an increased fineness of the hydrated lime particles in these tailor made slurries increases the chemical reactivity and reduces the sedimentation rate of these products.

Unfortunately, a higher solids content and an increased particle fineness are properties which both increase the slurry viscosity. Viscosities which are too high negatively affect the handling characteristics of the slurry. As a result, these two parameters usually have to be selected to maximize either the chemical reactivity or the solids content. In other words, a compromise is reached between the two parameters in order to maintain the desired properties of a liquid suspension.

U.S. Pat. No. 5,616,283, entitled "High Solids Lime As A Caustic Replacement", issued Apr. 1, 1997, and assigned to the assignee of the present invention is an example of the production of a calcium hydroxide slurry with a very high solids content (between 35 and 55%) which also maintains desirable chemical reactivity and flow properties.

An example of the production of a low solids calcium hydroxide slurry which is designed with a very fine particle size to maximize the chemical reactivity is given in German patent DE 27 14858 C3, issued Oct. 2, 1986 to Schaefer. In the production method described in the Schaefer patent, optimized slaking conditions and high shear rates applied during slaking are stated to be primarily responsible for the well dispersed and finely divided $Ca(OH)_2$ particles which are obtained in that process. Mean particle sizes below 1 µm are stated to be possible.

Another technique which can be utilized to obtain calcium hydroxide slurries with very fine particle sizes and increased chemical reactivity and handling characteristics is the wet milling of "conventional lime slurry" in a bead mill. The conventional lime slurry can be made by either slaking quicklime in water, or by mixing hydrated lime, $Ca(OH)_2$ with water. The properties of the final calcium hydroxide slurry depend upon the particle size of the starting hydrated lime, the throughput rate of the mill and the type and size of the grinding media used in the bead mill. Mean particle sizes of 2 µm and below are possible by utilizing these techniques.

As a result of the high particle-fineness, the solids contents of such ultra-fine calcium hydroxide slurries are usually limited ($\leq 20$ wt-%) to maintain acceptable flow properties and handling characteristics.

In almost all the end applications in which such optimized, fine, stable calcium hydroxide slurries are used, the water added in the production process by the calcium hydroxide slurry does not cause any adverse effects. One example would be the use of ultrafine calcium hydroxide slurry for the softening of drinking water. However, there are some applications, such as the addition of hydrated lime to bitumen to achieve a lime-modified asphalt-binder or the use of hydrated lime in the production of organic solvent based oil, grease and lubrication products, in which water introduced by the calcium hydroxide slurry causes problems or has the potential to cause problems.

In order to minimize the amount of water present, these production processes either utilize a calcium hydroxide slurry with a high solids content (which still contains more than 50 wt-% of water) or utilize a hydrated lime which is added as a dry powder. In these cases, it is usually not possible to optimize the properties of the hydrated lime, especially in terms of chemical reactivity, degree of dispersion or sedimentation behavior.

Additionally, when "normal" commercial hydrated lime is added to organic solvents, the $Ca(OH)_2$ particles have a tendency to agglomerate and do not form a stable suspension. Based upon the teaching of the above referenced German Patent No. DE 27 14858 C3 and similar references, it seem logical to assume that the application of high shear would result in the formation of stable suspensions. However, when high shear is applied to such unstable suspensions, the $Ca(OH)_2$ particles do not form stable, non-settling suspensions as would be expected. When the particle size of such normal hydrated lime is reduced either by air classification, milling or other means, it still does not form stable, non-settling calcium hydroxide suspensions.

SUMMARY OF THE INVENTION

A method is shown for manufacturing a stable, non-settling calcium hydroxide slurry having an organic solvent as a starting base. A hydrated lime component is first blended together with an organic solvent to form a dispersion of the lime component in the organic solvent. The hydrated lime and organic solvent dispersion is then wet milled in a media mill at a rate effective to form a stable suspension of hydrated lime particles in the organic solvent.

The preferred hydrated lime component is a dry calcium hydroxide powder which is formed by slaking quicklime or dolomitic quicklime in water and then driving off the excess water. The preferred organic solvents are selected from the group consisting of mineral oils and natural and synthetic lubricant oils and greases.

By mixing the hydrated lime and organic solvent dispersion through the use of wet milling in a media mill, a stable suspension of hydrated lime particles in the organic solvent can be produced in which the hydrated lime particles have a median particle size below about 10 µm. The resulting slurries can have greater than about 25% by weight lime solids content, based upon the total weight of the slurry. The particle size of the hydrated lime particles is reduced without a corresponding increase in calcium carbonate concentration in the slurry.

In a particularly preferred embodiment of the invention, a lubricating oil is produced having greater than about 20% hydrated lime solids by weight, based upon the total weight of lubricating oil. A dry, hydrated lime powder is first blended with a lubricating oil base to form a pre-dispersion of the hydrated lime in the lubricating oil. The hydrated lime and lubricating oil base is then mixed in a media mill at a shear rate effective to form a stable suspension of hydrated lime particles in the lubricating oil. The pre-dispersion can then be blended with the other components of the lubricating oil. The lubricating oil can be selected from the group consisting of mineral oils and natural and synthetic lubricating oils and greases.

Additional objects, features and advantages will be apparent in the written description which follows.

DETAILED DESCRIPTION OF THE INVENTION

The present invention involves the discovery that a very stable calcium hydroxide slurry can be made from a "normal" hydrated lime by intense media mill treatment. By utilizing a bead mill to mill an unstable suspension of hydrated lime in organic solvent, Applicants have produced suspensions of hydrated lime in mineral oils with defined particle size distributions, viscosities and sedimentation rates.

The steps in the method of the invention will be described with respect to the flow chart shown as FIG. 2. In the first step of the method, designated as 11, a normal hydrated lime is blended with an organic solvent. The conventional hydrated lime can be made in conventional fashion, as by slaking quicklime or dolomitic quicklime. Water can then be driven off to produce dry, hydrated lime which is usually a powder.

The organic solvent which is chosen will depend upon the particular end application. For example, the organic solvent might be the organic solvent present in a solvent based oil, grease or lubrication product in which water, introduced in the form of a calcium hydroxide slurry, might cause undesirable effects. Typical organic solvents include mineral oils and similar organic liquids.

Figure 1:
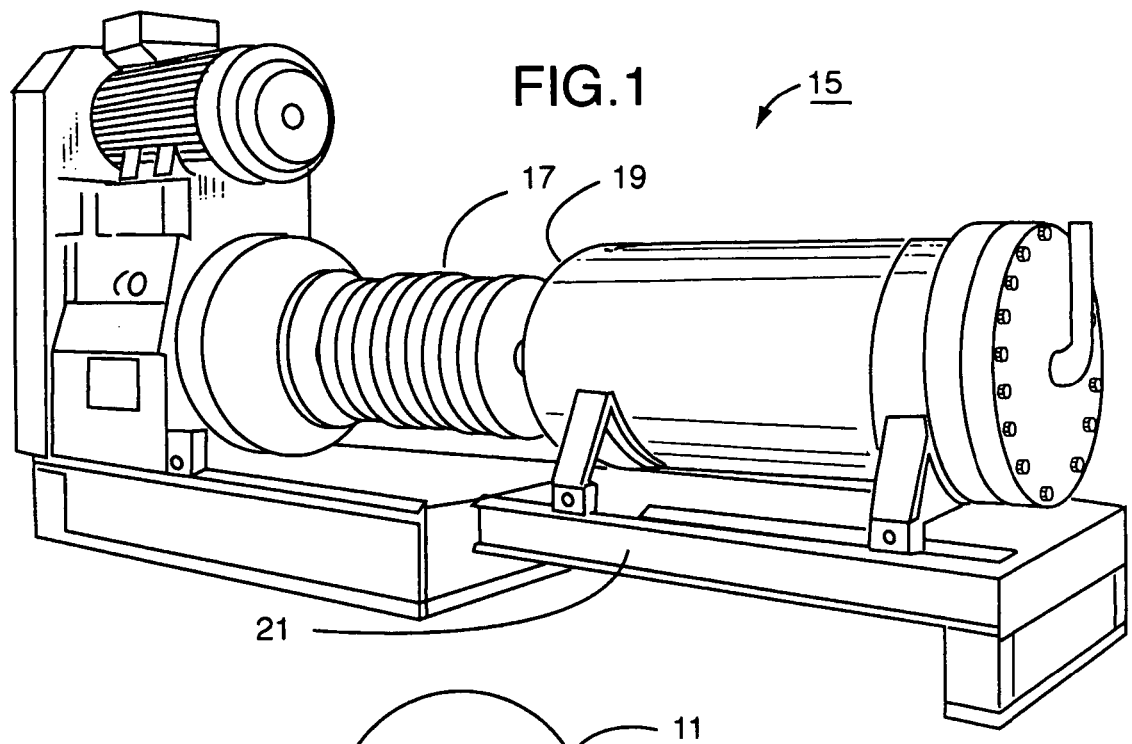
FIG. 1 is a perspective view of a horizontal media mill of the type used in the practice of the invention, the mill grinding chamber being opened for ease of illustration.
Figure 2:
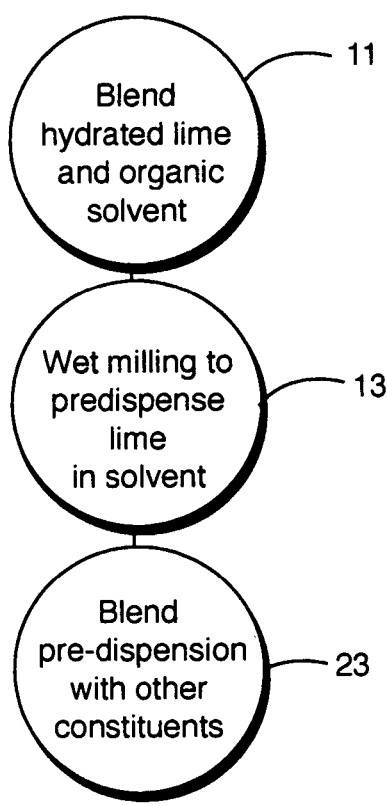
FIG. 2 is a flow chart of a method of manufacturing an organic lime slurry according to the method of the invention.

The next step in the method of the invention, designated as 13 in FIG. 2, is the wet milling of the hydrated lime and organic solvent blend in a media mill. Media mills are commercially available from a number of sources. For example, FIG. 1 shows a Molinex Horizontal Mill available from Netzsch Incorporated, Dispersion Equipment Division, of Exton, Pa., as the model LME 500K. This mill has a capacity of 560 liters and a product volume capacity of 280 liters, by way of example. The "media" which is utilized is typically ceramic beads.

Media mills of the type under consideration will be familiar to those skilled in the relevant arts. With reference to FIG. 1, the mill 15 includes large diameter grinding discs 17 which are received within a grinding chamber 19. The chamber 19 slides onto an attached track 21 for maintenance purposes and is shown in the open or extended position in FIG. 1 for ease of illustration. The grinding discs 17 utilized in the horizontal mill 15 produce high quality dispersions in large volumes.

In the particular media mill illustrated, the product is discharged through a dynamic cartridge media separator (not shown). An automatic ball variator and PIC interface are provided to allow the media volume to be changed in continuous operations. There are two grinding media feed connections and a combined grinding media product discharge connection on the chamber floor. The product is discharged through a slotted pipe (the dynamic cartridge media separator) located on the chamber floor. This slotted pipe projects into the rotor at the end of the agitator shaft and makes a pressure released discharge of the product possible. The drive is agitator driven by a hydraulic strain coupling and V-belt drive. The speed of the agitator shaft is approximately 420 RPM and the drive motor operates at 200 HP, 1000 RPM. In the embodiment of the device illustrated, the agitator consists of nine grinding discs of special steel and spacers of nickel chrome steel.

The use of intense media mill treatment makes it possible to produce tailor-made suspensions of hydrated lime in mineral oils (or similar organic liquids) that can be beneficially used in applications which require Ca(OH)$_2$ with a high chemical reactivity and a good stability (low sedimentation rate) but are sensitive to water introduced by "water-based" calcium hydroxide slurries. Table 1 below gives some test results which show the results obtained with the method of the invention.

TABLE 1

Influence of Bead Mill Treatment on Particle Size Distribution and Viscosity of Suspensions of 25 wt-% Hydrated Lime in 75 wt-% Mineral Base Oil

| Sample | Particle Size Distribution [μm] | | | | Viscosity [cP] @ 100 rpm |
|---|---|---|---|---|---|
| | 10% < | 50% < | 90% < | 99.9% < | |
| Ca(OH)$_2$-Suspension before bead milling | 1.9 | 4.4 | 8.3 | 15.4 | 2780 |
| after bead mill treatment 1 | 1.3 | 2.2 | 4.7 | 9.5 | 2850 |
| after bead mill treatment 2 | 1.0 | 1.6 | 2.5 | 5.2 | 5600 |

Some additional data showing the properties of hydrated lime dispersed in water and hydrated lime dispersed in oil is given in Tables 2 and 3 below:

Hydrated Lime Dispersed in Water ( H$_2$O-MoL Samples):

TABLE 1

Influence of Bead Mill treatment on Particle Size Distribution and Viscosities of H$_2$O–MoL-samples at 23.4% solids

| Sample | Laser-Granulometry (Horiba) [μm] | | | | | Brookfield-Viscosity [cP] at [1] | | | | | |
|---|---|---|---|---|---|---|---|---|---|---|---|
| | 10% < | 50% < | 90% < | 99% < | 99.9% < | 2.5 rpm | 5 rpm | 10 rpm | 20 rpm | 50 rpm | 100 rpm |
| Starting MoL | 2.03 | 4.56 | 8.28 | 12.01 | 15.20 | 1090 | 640 | 370 | 215 | 108 | 68 |
| H$_2$O–MoL 1 | 1.42 | 2.43 | 4.87 | 7.45 | 9.39 | 15080 | 9200 | 4970 | 2650 | 1150 | 625 |
| H$_2$O–MoL 2 | 0.86 | 1.31 | 2.08 | 3.06 | 3.98 | 37000 | 20600 | 18600 | 14900 | 6650 | 3560 |

Hydrated Lime Dispersed in Base Oil (O-MoL Samples):

TABLE 2

Influence of Bead Mill Treatment on Particle Size Distribution and Viscosities of O—MoL-samples at 25% solids

| Sample | Laser-Granulometry (Horiba) [μm] | | | | | Brookfield-Viscosity [cP] at [1] | | | | | |
|---|---|---|---|---|---|---|---|---|---|---|---|
| | 10% < | 50% < | 90% < | 99% < | 99.9% < | 2.5 rpm | 5 rpm | 10 rpm | 20 rpm | 50 rpm | 100 rpm |
| Start. O—MoL | 1.90 | 4.37 | 8.34 | 12.40 | 15.40 | 34560 | 19760 | 11640 | 7200 | 4070 | 2780 |
| O—MoL 1 | 1.34 | 2.22 | 4.65 | 7.50 | 9.52 | 78400 | 40800 | 21040 | 11120 | 5000 | 2850 |
| O—MoL 2 | 1.02 | 1.57 | 2.54 | 3.98 | 5.25 | 128000 | 91000 | 57400 | 30000 | 11700 | 5600 |

With reference to FIG. 2, an optional step 23 is illustrated in which the "pre-dispersion" from step 13 is blended with other constituents of the ultimate formulation. For example, in the case of a motor oil, the pre-dispersion is added to the main body of oil which may contain corrosion inhibitors, solid lubricant additives, etc. The overall mixture is then blended to produce a homogeneous oil product.

An invention has been provided with several advantages. The method of the invention utilizes the wet-milling of hydrated lime particles in a organic solvent such as mineral oil to produce a stable, non-settling calcium hydroxide slurry with defined solids, viscosity, reactivity, and particle size.

The organic solvent which is utilized can be any non-aqueous liquid that is compatible with the end use application of the calcium hydroxide, such as a mineral base oil for the use in calcium containing oil additives. An additional benefit of the method of the invention is that by wet milling in an organic solvent, the particle size of the calcium hydroxide particles can be reduced without an increase in its calcium carbonate concentration, which would normal occur when hydrated lime is air classified or dry milled in the presence of air. The method of the invention is also capable of producing stable, non-settling, ultra-fine particles of calcium oxide in organic solvents, where fine particles are needed for processing in organic matrices.

While the invention has been shown in only one of its forms, it is not thus limited but is susceptible to various changes and modifications without departing from the spirit thereof.

What is claimed is:

1. A method of manufacturing a stable, non-settling calcium hydroxide slurry having an organic solvent base, the method comprising the steps of:

physically blending together a mixture of components consisting essentially of a hydrated lime component and an organic solvent to form a dispersion of the lime component in the organic solvent;

mixing the hydrated lime and organic solvent dispersion in a media mill at a rate effective to form a stable suspension of hydrated lime particles in the organic solvent.

2. The method of claim 1, wherein the hydrated lime component is selected from the group consisting of Ca(OH)$_2$ and Ca(OH)$_2$.Mg(OH)$_2$ powders.

3. The method of claim 1, wherein the hydrated lime component is a calcium hydroxide powder which is made by slaking quicklime in water ad then driving off the excess water.

4. The method of claim 1, wherein the organic solvent is selected from the group consisting of mineral oils and natural and synthetic lubricant oils and greases.

5. A method of manufacturing a stable, non-settling calcium hydroxide slurry having an organic solvent base, the calcium hydroxide slurry having a defined solids content, viscosity, reactivity and particle size range, the method comprising the steps of:
   physically blending together a hydrated lime component and an organic solvent to form a dispersion of the lime component in the organic solvent;
   mixing the hydrated lime and organic solvent dispersion in a media mill at a rate effective to form a stable suspension of hydrated lime particles in the organic solvent, the hydrated lime particles having a median particle size of about 10 micrometers or less; and
   wherein the slurry has a solids content which is greater than about 20% by weight, based upon the total weight of the slurry, the solids content, viscosity, reactivity and particle size range of the hydrated lime particles being maintained within acceptable ranges without the necessity of adding additional water to the slurry.

6. The method of claim 5, wherein the media used in the media mill is ceramic beads.

7. The method of claim 5, wherein the particle size of the hydrated lime particles is reduced without a corresponding increase in calcium carbonate concentration in the slurry.

8. A method of producing a lubricating oil having greater than about 20% hydrated lime solids by weight, based upon the total weight of lubricating oil, the method comprising the steps of:
   physically blending together a mixture of components consisting essentially of a dry hydrated lime powder and a lubricating oil base to form a dispersion of the hydrated lime in the lubricating oil;
   mixing the hydrated lime and lubricating oil in a media mill at a shear rate effective to form a stable suspension of hydrated lime particles in the lubricating oil, the hydrated lime particles having a median particle size of about 10 micrometers or less.

9. The method of claim 8, wherein the dry hydrated lime powder is made by slaking quicklime in water and then driving off the excess water.

10. The method of claim 8, wherein the lubricating oil is selected from the group consisting of mineral oils and natural and synthetic lubricating oils and greases.

* * * * *